United States Patent
Fang et al.

(10) Patent No.: US 10,006,583 B2
(45) Date of Patent: Jun. 26, 2018

(54) DISPLAY MODULE SUPPORT FRAME AND DISPLAY DEVICE

(71) Applicants: BOE TECHNOLOGY GROUP CO., LTD., Beijing (CN); K-TRONICS (SU ZHOU) TECHNOLOGY CO., LTD., Suzhou, Jiangsu Province (CN)

(72) Inventors: Deli Fang, Beijing (CN); Jianbin Gao, Beijing (CN)

(73) Assignees: BOE TECHNOLOGY GROUP CO., LTD., Beijing (CN); K-TRONICS (SU ZHOU) TECHNOLOGY CO., LTD., Suzhou, Jiangsu Province (CN)

( * ) Notice: Subject to any disclaimer, the term of this patent is extended or adjusted under 35 U.S.C. 154(b) by 0 days. days.

(21) Appl. No.: 15/109,369

(22) PCT Filed: Jan. 12, 2016

(86) PCT No.: PCT/CN2016/070637
§ 371 (c)(1),
(2) Date: Jun. 30, 2016

(87) PCT Pub. No.: WO2017/008480
PCT Pub. Date: Jan. 19, 2017

(65) Prior Publication Data
US 2017/0146182 A1 May 25, 2017

(30) Foreign Application Priority Data
Jul. 15, 2015 (CN) .................... 2015 2 0513126 U

(51) Int. Cl.
*F16M 11/02* (2006.01)
*F16M 11/22* (2006.01)

(52) U.S. Cl.
CPC .................................. *F16M 11/22* (2013.01)

(58) Field of Classification Search
CPC ...................................................... F16M 11/22
(Continued)

(56) References Cited

U.S. PATENT DOCUMENTS

| 4,582,167 A | 4/1986 | Contreras |
| 4,923,157 A | 5/1990 | Belamiza |

(Continued)

FOREIGN PATENT DOCUMENTS

| CN | 202834650 U | 3/2013 |
| CN | 103234101 A | 8/2013 |
| CN | 204879335 U | 12/2015 |

OTHER PUBLICATIONS

Written Opinion of the International Searching Authority for international application No. PCT/CN2016/070637.

*Primary Examiner* — Gwendolyn W Baxter
(74) *Attorney, Agent, or Firm* — Harness, Dickey & Pierce, P.L.C.

(57) ABSTRACT

The present disclosure discloses a display module support frame and a display device. A display module support frame includes a machine support that is detachably connected to a display module. The machine support includes a horizontal supporting beam, two vertical supporting beams and two auxiliary supporting beams. The two vertical supporting beams are parallel, and face to each other. One end of each of the two vertical supporting beams is fixedly connected to the horizontal supporting beam. One end of each of the auxiliary supporting beams is fixedly connected to the horizontal supporting beam, and the other end thereof is fixedly connected to the vertical supporting beam.

15 Claims, 8 Drawing Sheets

(58) Field of Classification Search
USPC ....... 248/176.1, 917, 918, 177.1; 361/679.21
See application file for complete search history.

(56) References Cited

U.S. PATENT DOCUMENTS

| | | | | |
|---|---|---|---|---|
| 6,354,658 | B1* | 3/2002 | Sher | A61G 5/1094 248/918 |
| 7,258,321 | B1* | 8/2007 | Storrs | F16M 11/10 248/251 |
| 8,459,599 | B2* | 6/2013 | Du | F16M 11/041 248/176.3 |
| 8,628,050 | B2* | 1/2014 | Truckor | F16M 11/30 182/82 |
| 2003/0121124 | A1* | 7/2003 | Chen | E05D 11/087 16/339 |
| 2007/0145212 | A1* | 6/2007 | Yamanaka | F16M 11/22 248/176.1 |
| 2007/0247796 | A1* | 10/2007 | Lin | F16M 11/10 361/679.22 |
| 2008/0023601 | A1* | 1/2008 | Kuan | F16M 11/22 248/176.1 |
| 2008/0239643 | A1* | 10/2008 | Min | F16M 11/22 361/679.05 |
| 2010/0193648 | A1* | 8/2010 | Takao | F16M 11/22 248/163.1 |
| 2016/0135311 | A1* | 5/2016 | Liu | F16M 11/26 361/679.01 |

\* cited by examiner

US 10,006,583 B2

DISPLAY MODULE SUPPORT FRAME AND DISPLAY DEVICE

CROSS-REFERENCE TO RELATED APPLICATIONS

This application is the U.S. national phase of PCT Application No. PCT/CN2016/070637 filed on Jan. 12, 2016, which claims priority to Chinese Patent Application No. 201520513126.9 filed in China on Jul. 15, 2015, the disclosures of which are incorporated in their entirety by reference herein.

TECHNICAL FIELD

The present disclosure relates to the field of the display technique, in particular to a display module support frame and a display device.

BACKGROUND

One display device includes a display module and a housing mounted on a back of the display module. Currently, the size of the display device becomes larger and larger, and then the display module included in the display device is easily deformed. Therefore, during the use of the display device, the display module is needed to be supported with a display module support frame. The display module support frame is inserted between the back of the display module and the housing, and is connected to the back of the display module so as to support the display module.

The inventor of the present disclosure has found out that the display module support frame in the related art only provides a low supporting strength due to its unreasonable structure design, and thus the display module is still easily deformed during applications, which causes the phenomenon of twisting and swaying from side to side, thereby adversely affecting display effect of the display device.

SUMMARY

One object of the present disclosure is to provide a display module support frame and a display device so as to enhance supporting strength of the display module support frame.

In order to achieve the above object, the display module support frame provided by the present disclosure adopts the following technical solution.

A display module support frame includes a machine support that is detachably connected to a display module. The machine support includes a horizontal supporting beam, two vertical supporting beams and two auxiliary supporting beams. The two vertical supporting beams are parallel to each other and face each other. One end of each of the two vertical supporting beams is fixedly connected to the horizontal supporting beam. One end of each of the auxiliary supporting beams is fixedly connected to the horizontal supporting beam, and the other end thereof is fixedly connected to the vertical supporting beam.

In the display module support frame provided by the present disclosure, since the machine support includes one horizontal supporting beam, two vertical supporting beams and two auxiliary supporting beams, as well as each of the supporting beams has the above-mentioned connection relations, thus the display module support frame has high strength and good stability and is not easily deformed due to interactions of force between the supporting beams. As a result, the display module support frame has high supporting strength, which can effectively prevent the display module from twisting and swaying from side to side during application, thereby further improving the display effect of the display device.

BRIEF DESCRIPTION OF THE DRAWINGS

In order to make the technical solutions in the related art or the embodiments of present disclosure more apparent, the drawings related to the embodiments will be described hereinafter briefly. Obviously, the following drawings merely relate to a part of, rather than all of, the embodiments of the present disclosure, and based on these drawings, a person skilled in the art may, without any creative effort, obtain the other embodiments.

DETAILED DESCRIPTION

The display module support frame and the display device to be protected by the present disclosure will be further described in details in conjunction with the drawings.

Figure 1:
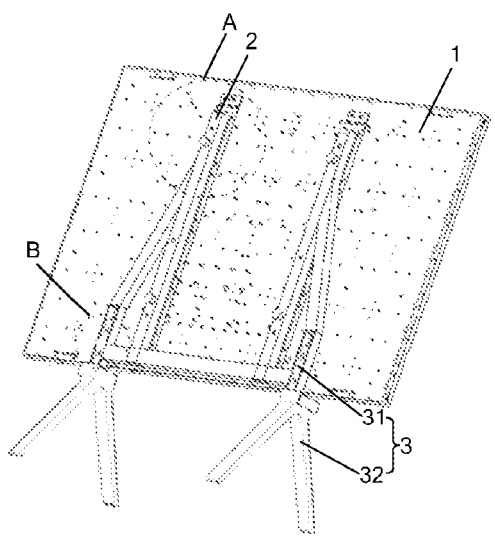
FIG. 1 is a schematic view showing a display device according to at least some embodiments of the present disclosure.
Figure 2:
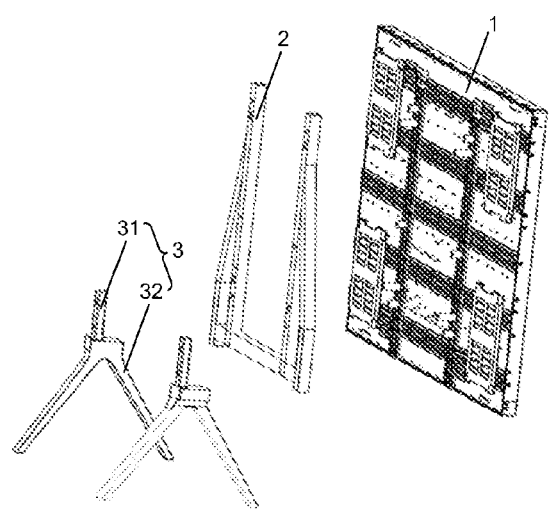
FIG. 2 is an exploded view of the display device shown in FIG. 1.
Figure 7:
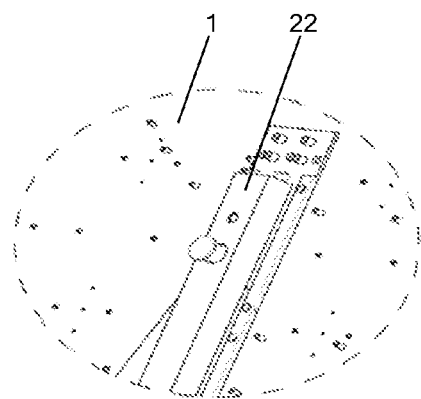
FIG. 7 is an enlarged view of a region A in FIG. 1.

One embodiment of the present disclosure provides a display module support frame. As shown in FIGS. 1 and 2, the display module support frame includes a machine support 2 that is detachably connected to a back of a display module 1. As shown in FIGS. 3-6, the machine support 2 includes a horizontal supporting beam 21, two vertical supporting beams 22 and two auxiliary supporting beams 23. The two vertical supporting beams 22 are parallel to each other and face each other. One end of each of the two vertical supporting beams 22 is fixedly connected to the horizontal supporting beam 21. One end of each of the auxiliary supporting beams 23 is fixedly connected to the horizontal supporting beam 21, and the other end thereof is fixedly connected to the vertical supporting beam 22. For example, as shown in FIG. 7, the vertical supporting beams 22 of the machine support 2 are connected to the back of the display module 1 via screws, thereby realizing a detachable connection between the machine support 2 and the back of the display module 1.

In the display module support frame provided by the present disclosure, the machine support includes one horizontal supporting beam, two vertical supporting beams and two auxiliary supporting beams, and the various supporting beams have the above-mentioned connection relations. As a result, the display module support frame has high structural strength, good stability and is not easily deformed due to interactions of the force among the various supporting beams. Therefore, the display module support frame has a high supporting strength, which can effectively eliminate the phenomenon of twisting and swaying from side to side during the use of the display module, thereby improving display effect of the display device.

It should be noted that, the auxiliary supporting beam 23 of the machine support 2 in one embodiment of the present disclosure may have several possible structures. For example, the auxiliary supporting beam 23 may be an inclined supporting beam shown in FIG. 6, or may also adopt the structure shown in FIG. 3. When the machine support 2 adopts the structure shown in FIG. 3 or FIG. 6, the machine support 2 is constructed in a geometrical shape formed by a right angle plus a triangle. Thus, it is not easily deformed and has high supporting strength.

Figure 3:
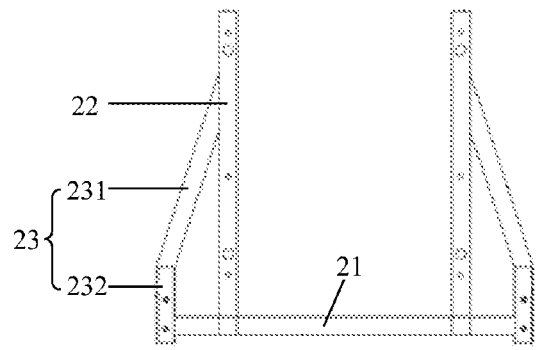
FIG. 3 is a front view of a machine support according to at least some embodiments of the present disclosure.
Figure 4:
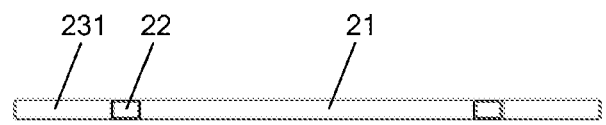
FIG. 4 is a top view of the machine support shown in FIG. 3.
Figure 5:
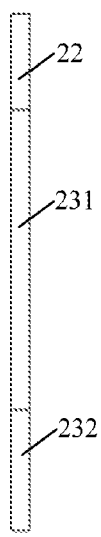
FIG. 5 is a side view of the machine support shown in FIG. 3.
Figure 6:
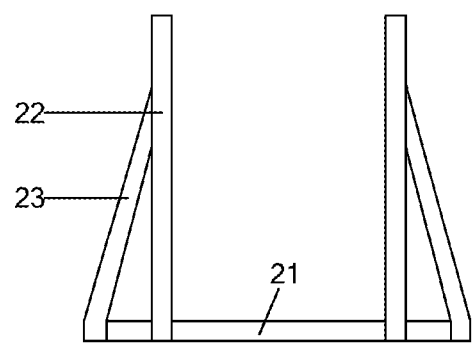
FIG. 6 is a front view of a machine support according to at least some embodiments of the present disclosure.
Figure 8:
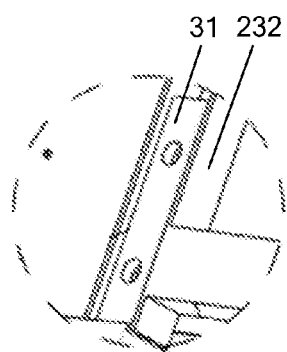
FIG. 8 is an enlarged view of a region B in FIG. 1.

Specifically, as shown in FIG. 3, the auxiliary supporting beam 23 includes an inclined first auxiliary supporting beam 231 and a vertical second auxiliary supporting beam 232. Two ends of the first auxiliary supporting beam 231 are fixedly connected to one end of the vertical supporting beam 22 and one end of the second auxiliary supporting beam 232, respectively. Two ends of the second auxiliary supporting beam 232 are fixedly connected to one end of the first auxiliary supporting beam 231 and one end of the horizontal supporting beam 21, respectively. As shown in FIGS. 1 and 2, the display module support frame further includes a base support 3. The base support 3 includes a connection portion 31. As shown in FIG. 8, the second auxiliary supporting beam 232 can be detachably connected to the connection portion 31 of the base support 3 so as to realize a detachable connection between the machine support 2 and the base support 3. Since the second auxiliary supporting beam 232 matches the base support 3 in shape and they have a large contact area, thus, a secure connection is made between the machine support 2 and the base support 3. Therefore, the auxiliary supporting beam 23 according to at least some embodiments of the present disclosure adopts the structure shown in FIG. 3.

Further, in at least some embodiments of the present disclosure, the horizontal supporting beam 21, the vertical supporting beam 22 and the first auxiliary supporting beam 231 of the machine support 2 are square steel supporting beams having high strength, which further enhances the supporting strength of the machine support 2. The second auxiliary supporting beam 232 is a U-shaped steel supporting beam. As shown in FIG. 8, the connection portion 31 of the base support 3 is directly inserted into a U-shaped groove of the U-shaped steel supporting beam, and is fixed via a screw. Then, the detachable connection between the second auxiliary supporting beam 232 and the connection portion 31 of the base support 3 can be realized, and the operation is very simple.

In addition, for supporting the display module 1 in a better manner, as shown in FIGS. 1-2, the display module support frame in the embodiments of the present disclosure may include two base supports 3 that are detachably connected to the machine support 2. The base supports 3 are used for supporting the machine support 2 so as to enable the display module support frame to support the display module 1 in a better manner. The base supports 3 may be made of aluminum alloy. Since aluminum alloy has advantages of low density and high hardness, thus, the base support 3 in the embodiment of the present disclosure has high supporting strength and a light weight and possesses good practicability.

For example, as shown in FIGS. 9-12, each of the base supports 3 includes the connection portion 31 and at least two supporting portions 32. The connection portion 31 is detachably connected to the machine support 2. A top portion of each supporting portion 32 is fixedly connected to the connection portion 31, and a bottom portion thereof is bifurcated. Therefore, different connection portions 31 may provide the machine support 2 with supporting forces from different directions so as to stably support the machine support 2, thereby further improving the supporting strength of the display module support frame. As an example, the supporting portion 32 may be a supporting plate or a supporting leg.

Figure 9:
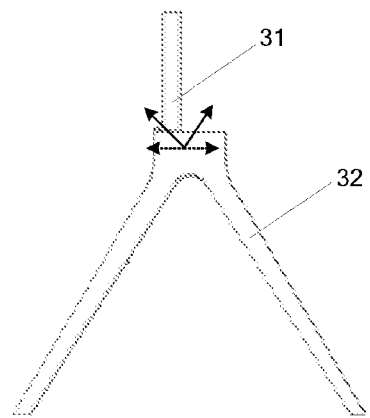
FIG. 9 is a front view of a base support according to at least some embodiments of the present disclosure.
Figure 10:
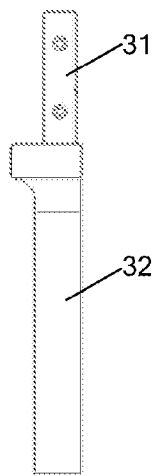
FIG. 10 is a right-side view of the base support in FIG. 9.
Figure 11:
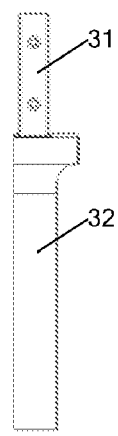
FIG. 11 is a left-side view of the base support in FIG. 9.
Figure 12:
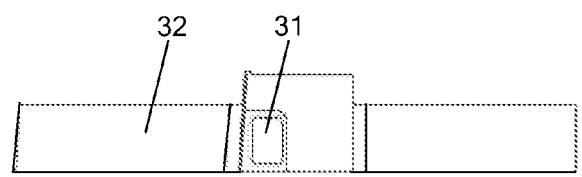
FIG. 12 is a top view of the base support in FIG. 9.

In one embodiment of the present disclosure, as shown in FIG. 9, each of the base supports 3 includes two supporting portions 32 that are mutually divergent in a normal direction of a plane where the display module 1 is, thereby further enabling the display module support frame to have a high supporting strength as well as a nice-looking and simple structure. Further, in one embodiment of the present disclosure, as shown in FIG. 9, the two supporting portions 32 are symmetrical to each other along the plane where the display module 1 is. At this point, a supporting force (which is indicated with a solid arrow in the figure) provided by each supporting portion 32 has a first component force that is a vertical upward force and a second component force (which is indicted with a dotted arrow in the figure) in the normal direction of the plane where the display module 1 is. The two first component forces are vertical upward forces, and they function cooperatively to support the display module 1, thereby to further guarantee relatively high supporting strength for the display module support frame. Besides, the two second component forces are opposite in direction, but they are equal in size. Therefore, a resultant force of the second component forces of the supporting forces provided by the two supporting portions 32 in the normal direction of the plane where the display module 1 is, is zero, so as to effectively prevent the display module 1 from tilting forward or backward during application, thereby facilitating improving the display effect of the display device.

Figure 13:
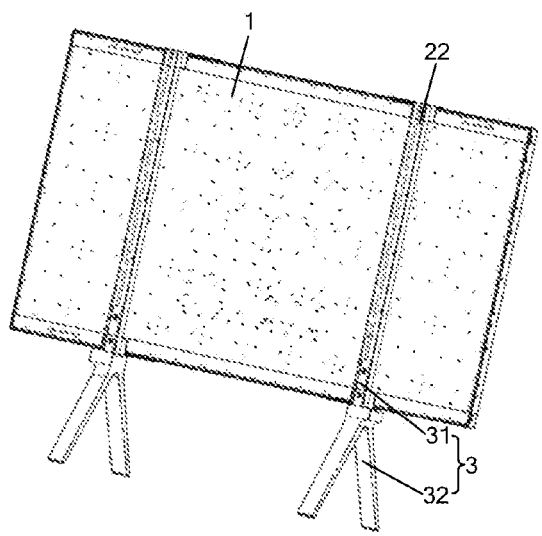
FIG. 13 is a schematic view showing a display device according to at least some embodiments of the present disclosure.
Figure 14:
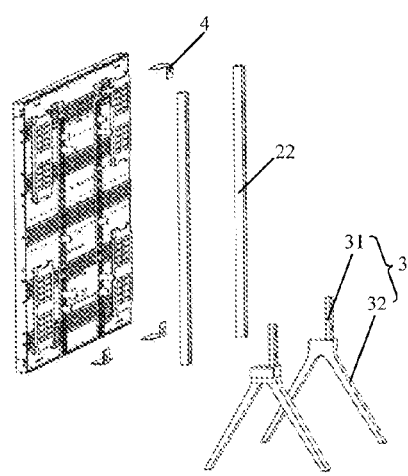
FIG. 14 is an exploded view of the display device in FIG. 13.

In addition, at least some embodiments of the present disclosure further provide another machine support. As shown in FIGS. 13 and 14, the machine support includes two vertical supporting beams 22. The vertical supporting beams 22 may be U-shaped steel support beams. At this point, when the display module support frame includes two base support 3 shown in FIG. 9, two connection portions 31 of the two base supports 3 may be inserted into U-shaped grooves at bottoms of the two vertical supporting beams 22 and fixed via screws, respectively. As a result, the detachable connection between the machine support and the base support 3 can be achieved. The machine support shown in FIGS. 13 and 14 has a simple structure and a light weight, and is easy to be assembled, however, its supporting strength is lower than that of the machine support shown in FIG. 3.

Figure 15:
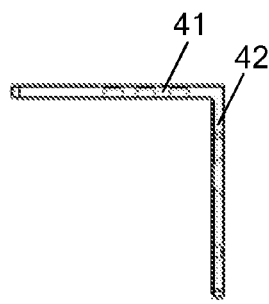
FIG. 15 is a side view of a connector according to at least some embodiments of the present disclosure.
Figure 16:
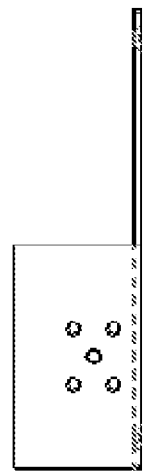
FIG. 16 is a top view of the connector in FIG. 15.
Figure 17:
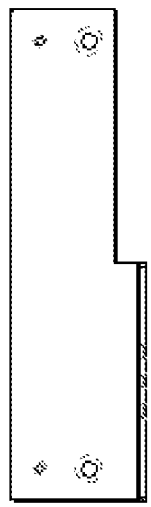
FIG. 17 is a side view of the connector in FIG. 15.

For facilitating connecting the machine support to the back of the display module 1, as shown in FIGS. 13-14, the display module support frame in one embodiment of the present disclosure further includes four connectors 4. One end of each connector 4 is detachably connected to one end of one vertical supporting beam 22, and the other end thereof is detachably connected to the back of the display module 1. Specifically, as shown in FIGS. 15-17, each of the connectors 4 includes a first connecting sheet 41 and a second connecting sheet 42 that perpendicularly extends from an edge of the first connecting sheet 41. The first connecting sheet 41 is detachably connected to the back of the display module 1, and the second connecting sheet 42 is detachably connected to one end of the vertical supporting beam 22.

In addition, one embodiment of the present disclosure further provides a display device. As shown in FIG. 1-2 or 13-14, the display device includes a display module and a display module support frame according to any of the above mentioned embodiments. In at least some embodiments of the present disclosure, the back of the display module 1 is detachably connected to the machine support so as to facilitate the use, assembly and transportation of the display device.

According to different structures of the machine support, the manners of detachably connecting the machine support to the back of the display module 1 may include the following two types.

For one example, the structure of the machine support is shown in FIG. 3. The machine support is detachably connected to the back of the display module 1 by connecting the two vertical supporting beams 22 of the machine support with the back of the display module 1 through screws.

For another example, the structure of the machine support is shown in FIGS. 13-14. The machine support is detachably connected to the back of the display module 1 by connecting the first connecting sheet 41 of the connector 4 with the back of the display module 1 via screws and connecting the second connecting sheet 42 of the connector 4 with one end of each of the two vertical supporting beams 22 of the machine support via screws.

Further, the display device may include a conductive housing. The housing covers the back of the display module 1 and the machine support. For example, the housing may be made of aluminum alloy having a low density and a high hardness. Such a design has following three beneficial effects: first, the housing can protect the display module 1 and the machine support; second, a sealed space is defined between the conductive housing and the machine support, the space just corresponds to positions where a complete machine circuit, a fan and a heat dissipation port are provided, and thus heat generated by the complete machine circuit can be quickly dissipated outside and the heat hardly can be transmitted to other positions; third, the sealed space can separate the complete machine circuit from the circuit of the display module 1, which may effectively avoid electromagnetic influence between them, thereby further improving the display effect of the display device.

The above are merely optional embodiments of the present disclosure, and the protection scope of the present disclosure is not limited thereto. It should be noted that, a person skilled in the art may easily conceive of making further variations and substitutions within the disclosure of the present disclosure, and these variations and substitutions shall also be included in the scope of the present disclosure. Hence, the scope of the present disclosure is subject to the appended claims.

What is claimed is:

1. A display module support frame, comprising:
a machine support configured to be detachably connected to a display module;
wherein the machine support comprises a horizontal supporting beam, two vertical supporting beams and two auxiliary supporting beams;
wherein the two vertical supporting beams are parallel to each other and juxtapose to each other; one end of each of the two vertical supporting beams is fixedly connected to the horizontal supporting beam; one end of each of the auxiliary supporting beams is fixedly connected to the horizontal supporting beam, and the other end of each of the auxiliary supporting beams is fixedly connected to one of the vertical supporting beams; and each of the auxiliary supporting beams comprises a first auxiliary supporting beam that is arranged inclined relative to the vertical supporting beam and the horizontal supporting beam; wherein each of the auxiliary supporting beams further comprises a vertical second auxiliary supporting beam; two ends of the first auxiliary supporting beam are fixedly connected to one end of the vertical supporting beam and one end of the second auxiliary supporting beam, respectively; two ends of the second auxiliary supporting beam are fixedly connected to one end of the first auxiliary supporting beam and one end of the horizontal supporting beam, respectively.

2. The display module support frame according to claim 1, wherein each of the auxiliary supporting beams further comprises a vertical second auxiliary supporting beam; two ends of the first auxiliary supporting beam are fixedly connected to one end of the vertical supporting beam and one end of the second auxiliary supporting beam, respectively; two ends of the second auxiliary supporting beam are fixedly connected to one end of the first auxiliary supporting beam and one end of the horizontal supporting beam, respectively.

3. The display module support frame according to claim 1, further comprising two base supports that are detachably connected to the machine support; wherein the base supports support the machine support.

4. The display module support frame according to claim 3, wherein each of the base supports comprises a connection portion and at least two supporting portions; wherein the connection portion is detachably connected to the machine support; and tops of all of the supporting portions are fixedly connected to the connection portion, and bottoms thereof are bifurcated.

5. The display module support frame according to claim 4, wherein each of the base supports comprises two supporting portions that are mutually divergent in a normal direction of a plane of the display module.

6. The display module support frame according to claim 5, wherein the two supporting portions are symmetrical to each other along the plane of the display module.

7. The display module support frame according to claim 4, wherein the supporting portions are supporting plates or supporting legs.

8. The display module support frame according to claim 1, wherein two ends of the first auxiliary supporting beam are fixedly connected to one end of the vertical supporting beam and one end of the horizontal supporting beam, respectively.

9. A display device, comprising: a display module and a display module support frame according to claim 1.

10. The display device according to claim 9, wherein a back of the display module is detachably connected to the machine support.

11. The display device according to claim 9, wherein the display device further comprises a conductive housing; the housing covers the back of the display module and the machine support.

12. A display module support frame, comprising:
a machine support;
a base support; and
connectors;
wherein:
the base support is detachably connected to the machine support; the machine support comprises two vertical supporting beams; the two vertical supporting beams are parallel to and juxtapose to each other; and one end of each of the connectors is detachably connected to corresponding one of the vertical supporting beams, and the other end thereof is detachably connected to the display module;
each of the connectors comprises a first connecting sheet and a second connecting sheet that perpendicularly extends from an edge of the first connecting sheet; the first connecting sheet is configured to be detachably connected to the display module and the second connecting sheet is detachably connected to the corresponding one of the vertical supporting beams;
each of the vertical supporting beams is a U-shaped steel supporting beam; the base support comprises a connection portion; the connection portion is in a U-shaped groove of corresponding one of the vertical supporting beams and is connected to the corresponding one of the vertical supporting beam via a screw; and
the base support further comprises at least two bifurcated supporting portions, and tops of the at least two supporting portions are mutually connected to define a rectangular upper surface; and the connection portion is at a corner of the rectangular upper surface.

13. The display module support frame according to claim 12, wherein the machine support further comprises a horizontal supporting beam and two auxiliary supporting beams;
one end of each of the two vertical supporting beams is fixedly connected to the horizontal supporting beam; one end of each of the auxiliary supporting beams is fixedly connected to the horizontal supporting beam, and the other end thereof is fixedly connected to the vertical supporting beam.

14. The display module support frame according to claim 13, wherein each of the auxiliary supporting beams comprises an inclined first auxiliary supporting beam and a vertical second auxiliary supporting beam; two ends of the first auxiliary supporting beam are fixedly connected to one end of the vertical supporting beam and one end of the second auxiliary supporting beam, respectively; and two ends of the second auxiliary supporting beam are fixedly connected to one end of the first auxiliary supporting beam and one end of the horizontal supporting beam, respectively;
the horizontal supporting beam, the vertical supporting beams and the first auxiliary supporting beam are square steel supporting beams, and the second auxiliary supporting beam is a U-shaped steel supporting beam; and
the base support comprises a connection portion; the connection portion is in a U-shaped groove of corresponding one of the second auxiliary supporting beams and is connected to the corresponding one of the second auxiliary supporting beams via a screw.

15. A display module support frame, comprising:
a machine support configured to be detachably connected to a display module; and
two base supports that are detachably connected to the machine support, wherein the base supports support the machine support;
wherein the machine support comprises a horizontal supporting beam, two vertical supporting beams and two auxiliary supporting beams; the two vertical supporting beams are parallel to each other and juxtapose to each other; wherein one end of each of the two vertical supporting beams is fixedly connected to the horizontal supporting beam, one end of each of the auxiliary supporting beams is fixedly connected to the horizontal supporting beam, and the other end of each of the auxiliary supporting beams is fixedly connected to one of the vertical supporting beams,
wherein each of the base supports comprises a connection portion and at least two supporting portions; and wherein the connection portion is detachably connected to the machine support, and tops of all of the supporting portions are fixedly connected to the connection portion, and bottoms thereof are bifurcated.

* * * * *